UNITED STATES PATENT OFFICE.

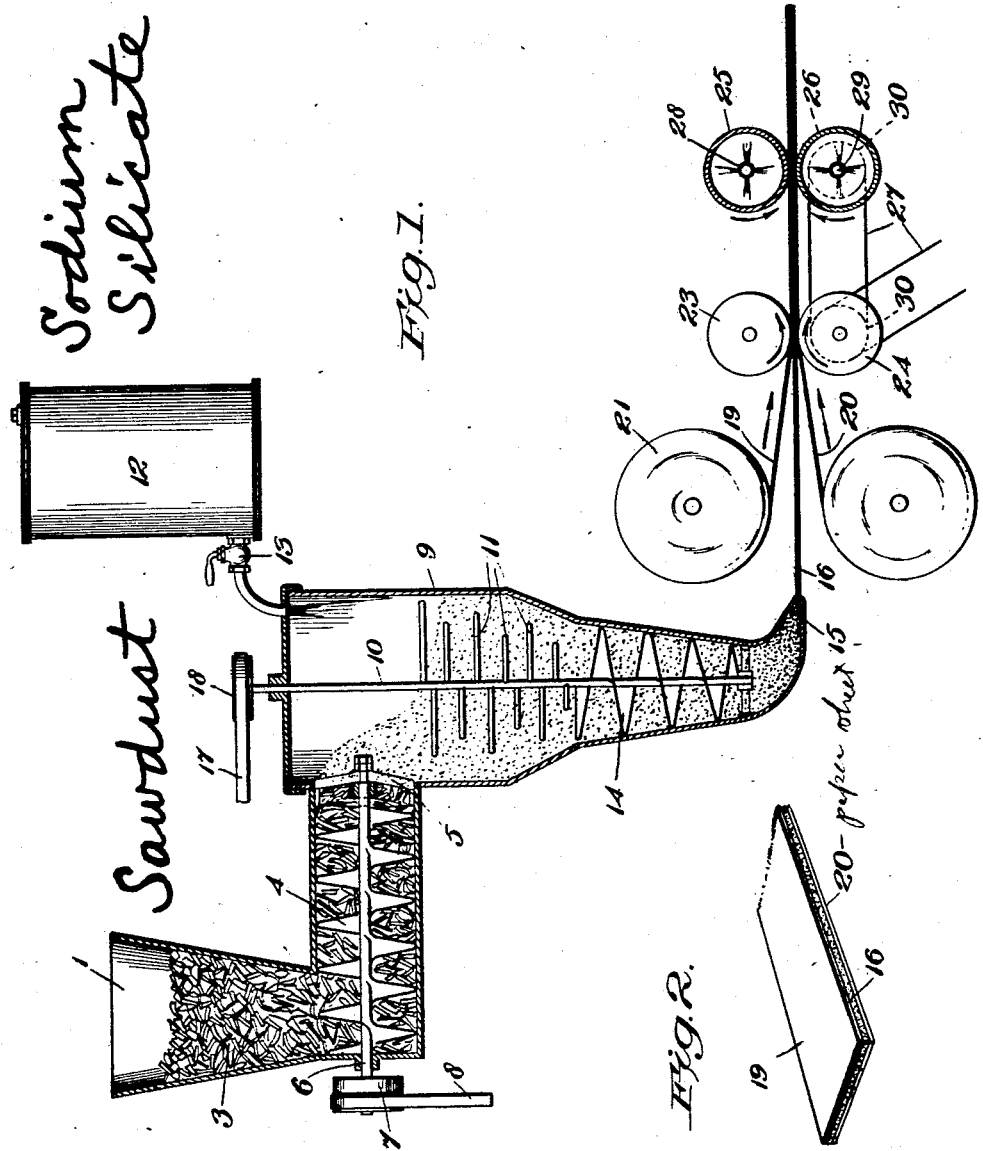

GEORGE W. BEADLE, OF BAYONNE, NEW JERSEY, ASSIGNOR TO SINGLE SERVICE PACKAGE CORPORATION OF AMERICA, OF NEW YORK, N. Y., A CORPORATION OF NEW JERSEY.

PROCESS OF MANUFACTURING COMPO-BOARD.

1,125,445.

Specification of Letters Patent. Patented Jan. 19, 1915.

Application filed October 24, 1911. Serial No. 656,437.

*To all whom it may concern:*

Be it known that I, GEORGE W. BEADLE, a citizen of the United States, residing at Bayonne, in the county of Hudson and State of New Jersey, have invented certain new and useful Improvements in Processes of Manufacturing Compo-Board; and I do hereby declare the following to be a full, clear, and exact description of the invention, such as will enable others skilled in the art to which it appertains to make and use the same.

This invention relates to a process for manufacturing the material known as compo board, and has for its object to produce compo board in a quick and comparatively inexpensive manner.

To these ends the invention consists in the novel steps constituting my process, as will be more fully hereinafter described and particularly pointed out in the claims.

Referring to the accompanying drawings forming a part of this specification in which like numerals designate like parts in all the views:—Figure 1 is a diagrammatic view of a machine suitable for carrying out my improved process; and, Fig. 2 is a detail perspective view of a piece of compo board made by my process.

1 indicates the hopper of any suitable wood cutting machine for receiving the waste products from a mill such as small chips of wood or shavings 3, and which are adapted to be fed by a feed screw 4 to and past the cutting knives 5 for cutting the wood material into small particles, such as saw dust. The feed screw 4 has mounted on the outer end of its shaft 6 a pulley 7 over which a belt 8 runs for driving the same from any suitable source of power.

A tank 9 is connected to the discharge end of the cutting machine and is adapted to receive the saw dust therefrom. This tank has mounted therein in suitable bearings a shaft 10 on the central part of which is mounted agitators 11 for thoroughly mixing up the saw dust with a solution of silicate of sodium which is fed in proper proportions from the tank 12 by the cock or regulator 13. The lower part of the tank 9 is cone shaped and has mounted therein on the lower part of the shaft 10, a feed screw 14, which screw forces the saw dust, thoroughly saturated with the sodium silicate, through the discharge end or spout 15 in the form of a ribbon or sheet 16. The shaft 10 carrying the agitator 11 and feed screw 14, is revolved by the belt 17 driven from any suitable source of power, passing over the pulley 18. The sheet or ribbon 16 of saw dust saturated with the sodium silicate, after it leaves the discharge spout 15, is by means of the feed rolls 23 and 24, fed between two sheets of paper 19 and 20 carried by the rolls 21 and 22 to form a composite sheet. From the feed rolls the composite sheet of paper with the wood and silicate filler between, is then passed between the two heated rolls 25 and 26 where the whole is firmly pressed together under the influence of heat and formed into compo board.

28 and 29 indicate gas pipes for heating the pressure rolls 25 and 26 and keeping them at the proper temperature.

The feed rolls 23 and 24 together with the heated pressure rolls 25 and 26 are revolved in the direction of the arrows by the belts 27 and pulleys 30, as shown.

Heretofore compo board has been made up of strips of wood glued together and then these strips were glued between sheets of paper board. Not only are these strips more or less expensive in themselves, but they have to all be of uniform thickness and width, which entails additional expense on account of the cost of the labor and attention necessary to their production. By this invention, on the other hand, it will be seen that all the waste products of a mill, such as shavings, chip, and saw dust, may be utilized and that a compo board may be made at once in a simple and cheap manner without the necessary time and attention that has been heretofore required.

It is obvious that those skilled in the art may vary the details of my process without departing from the spirit thereof, and therefore I do not wish to be limited to the above disclosure except as may be required by the claims.

What I claim is:—

1. The process of producing compo board in a continuous operation, which consists in finely dividing a filling material; stirring said finely divided material with a suitable binder in a sticky form; forming the mixed binder and material into a sheet; feeding sheets of other material on each side of said first mentioned sheet while the latter is still wet to form a composite sheet; and finally subjecting said composite sheet to heat and pressure to dry and firmly bind the parts together, substantially as described.

2. The process of producing a compo board in a continuous operation, which consists in finely dividing woody material; stirring silicate of sodium in a liquid form into said material to serve as a binder; forming the said wood and sodium silicate into a pliable sticky sheet; feeding sheets of paper on each side of said formed sheet while the latter is still sticky to constitute a composite sheet; and finally subjecting said composite sheet to heat and pressure to dry and bind the parts together, substantially as described.

3. The process of producing a compo board in a continuous operation from wood chips, which consists in cutting said chips to form saw-dust; adding sodium silicate to said saw-dust; stirring the mixed saw-dust and silicate; forming the mixture into a sticky sheet; feeding a sheet of paper to each side of said first mentioned sheet while the latter is in motion and still sticky to form a composite sheet; and subjecting said composite sheet first to pressure and then to heat and pressure to firmly bind all the parts together, substantially as described.

In testimony whereof, I affix my signature, in presence of two witnesses.

GEORGE W. BEADLE.

Witnesses:
J. H. GEWECKE,
H. F. DODGIN.

Copies of this patent may be obtained for five cents each, by addressing the "Commissioner of Patents, Washington, D. C."